July 14, 1931.  J. C. FORTUNE  1,814,549
BACK PRESSURE VALVE
Filed Aug. 30, 1928    2 Sheets-Sheet 2

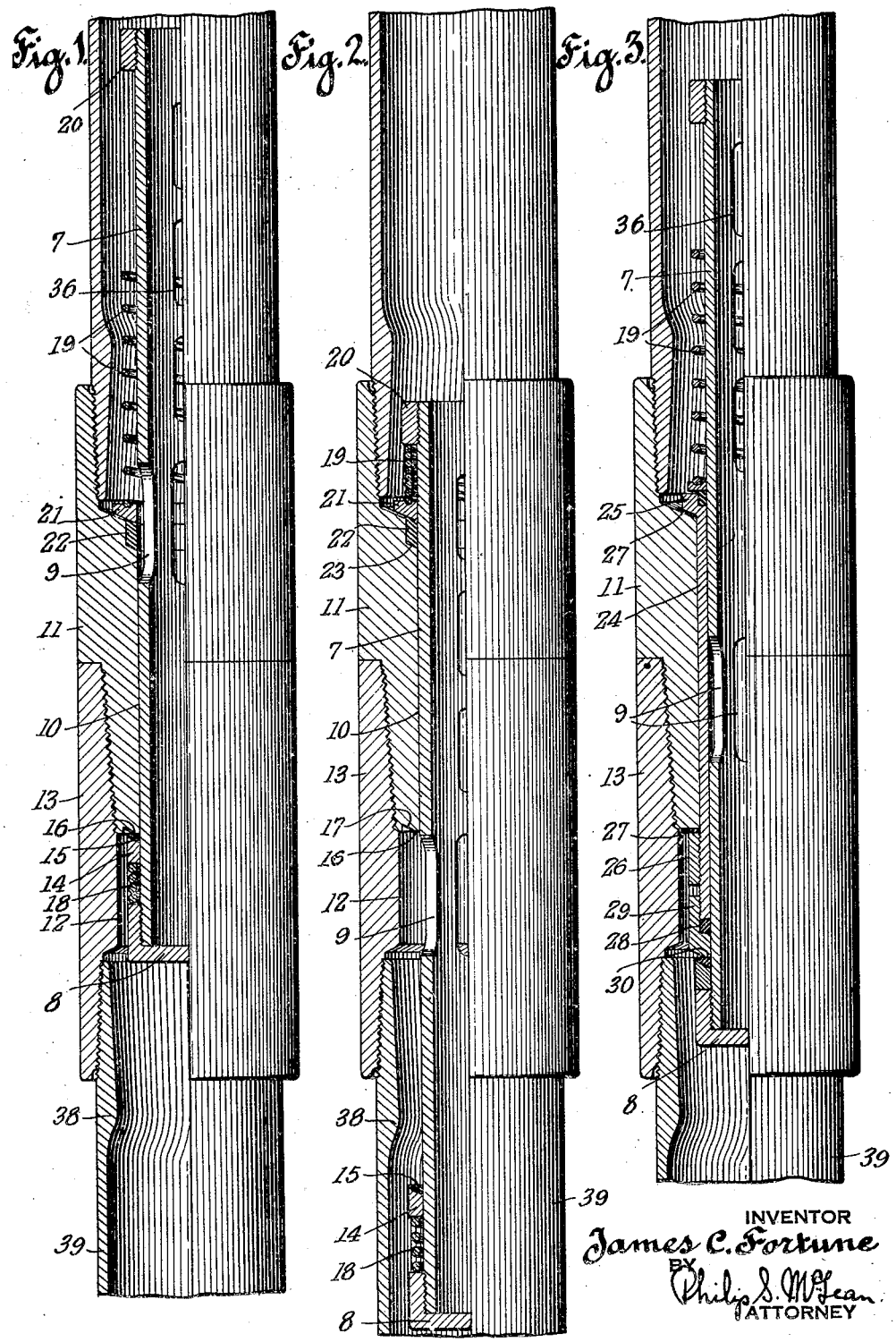

INVENTOR
James C. Fortune
BY
Philip S. McLean
ATTORNEY

Patented July 14, 1931

1,814,549

UNITED STATES PATENT OFFICE

JAMES C. FORTUNE, OF NEW YORK, N. Y.

BACK PRESSURE VALVE

Application filed August 30, 1928. Serial No. 302,964.

Special objects of this invention are to provide valve mechanism for checking the back pressure in a well, which will be of simple sturdy construction fully capable of withstanding wear to which it is subjected; which can be readily mounted in the drill string, or removed, as required, which will freely pass the flow through the drill pipe; which when closed will form a complete seal and will maintain its sealing qualities even after much wear, and which will be entirely practical and adapted for many uses.

One of the important novel features of the invention is the construction of the valve mechanism, so that it may be combined with and used as an attachment to an ordinary rotary tool joint. Other novel features and details of construction will appear as the specification proceeds.

The drawings accompanying and forming part of this specification illustrate a number of the different practical forms the invention may take, but it should be understood that the structure may be further modified without departure from the true spirit and broad scope of the invention.

Figure 4:
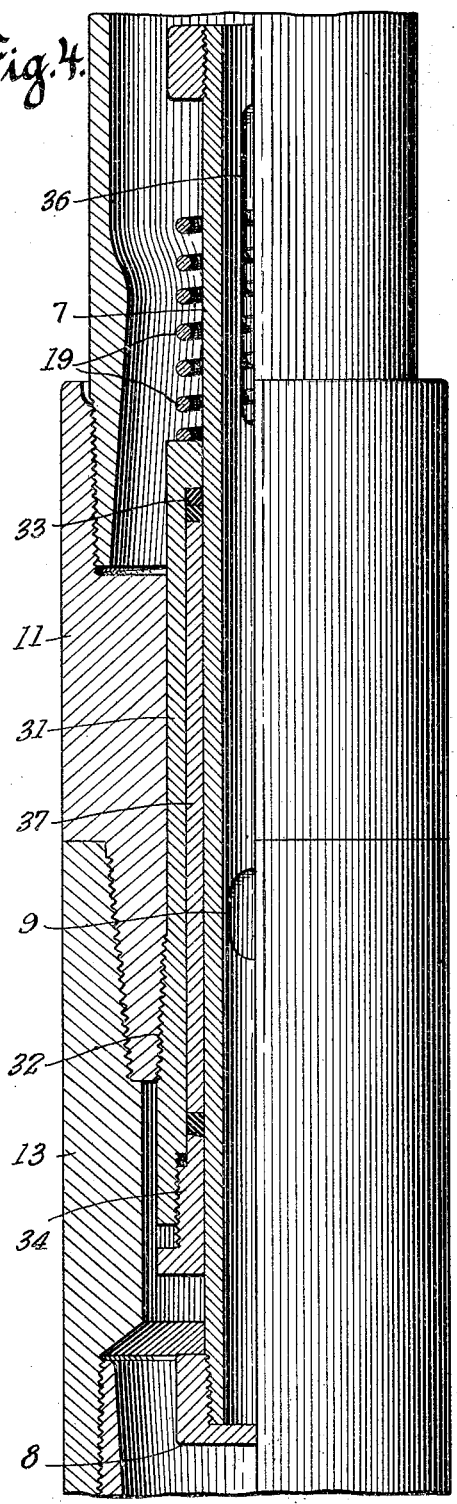
Figure 5:
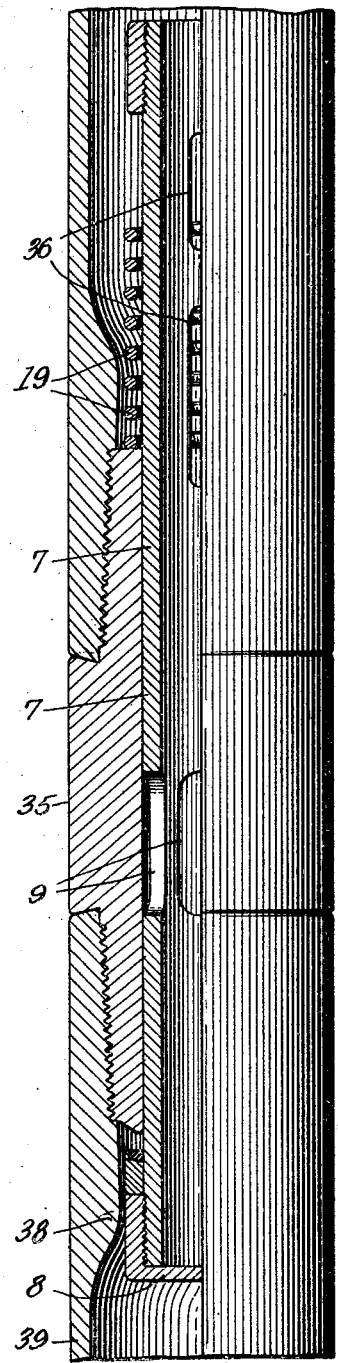

Fig. 1 is a broken sectional view of one form of the back pressure valve incorporated in the pin member of a rotary tool joint, the valve being indicated in the closed position; Fig. 2 is a similar view showing the valve in the open position; Fig. 3 is a broken sectional view showing a form of the invention in which the valve sleeve operates in a liner which can be mounted as a bushing in the bore of the tool joint member; Fig. 4 is a part sectional view of another form of liner construction of the valve; Fig. 5 is a part sectional view showing the invention incorporated in a flush joint form of coupling, unlined, as in the first form.

The valve is shown in the several illustrations as in the form of a sleeve 7 open at the upper end, closed at the lower end by a cap 8 and having valve port or ports 9 in the side of the same.

This valve sleeve according to the preferred form of the invention is made to operate in and cooperate in a valving sense with one of the members of the rotary tool joint. Thus as shown in Figs. 1 and 2, the valve sleeve is fitted to slide within the unlined bore 10 of the pin member 11 of a regular rotary tool joint, the lower closed end of the sleeve operating freely, with plenty of clearance in the enlarged bore 12 of the companion box member 13 of the joint.

The bore of the pin member is suitably "faced" or finished either directly or by means of a liner, to smoothly receive the valve sleeve and the ports in the sleeve are placed so that they will be in the clear when the valve is opened as in Fig. 2.

To provide an extra seal, a valving engagement may be effected between the lower end of the sleeve and the pin member, as in the illustration by providing a valve ring 14 on the lower end portion of the sleeve carrying a valve seal 15 to engage a valve seat 16 on the lower end of the pin. The end of the pin is shown as cut back at 17 from this valve seat, so that even if the end of the pin wears away, a sufficient seat for this end valve will still be left.

To cushion the movement of the valve sleeve when it snaps closed under pressure or when pressure of the drilling fluid is reduced sufficiently to permit it to close by pressure in the well, the lower end of the valve, which it will be seen also serves as a valve closing abutment, may be backed up by a spring 18 interposed between the end cap and the loose valve ring.

If desired, the valve sleeve may be held normally closed as by a spring 19 surrounding the upper portion of the sleeve in the upper screw socket portion of the pin member and acting against the underside of a collar 20 screwed on the upper end of the sleeve. An abutment collar 21 is shown provided for guiding and supporting the lower end of this spring and this abutment collar or washer is shown as utilized to impart pressure to a ring of packing material 22 seated in a recess 23 about the sleeve. This packing serves to exclude sand and grit and forms a relatively sliding seal about the sleeve. This packing is particularly desirable in working in some formations, preventing to a large extent scratching and wearing of the sleeve and to that extent maintaining a proper non-leaking sealing fit between the valve sleeve and the bore in which it operates. Also the spring for holding the valve closed, while generally desirable may in some instances be omitted where for example, it may be desired to have the valve normally hang open and be closed only when pressure is encountered in the well.

In order that the device may be made up as an attachment or accessory for any tool joint, a construction such as illustrated in Fig. 3 may be employed where the facing to provide the cylindrical valve seat is in the form of a liner 24 insertable in the bore of the pin member and serving as a seat for the valve sleeve. This liner is shown as having a flange 25 at its upper end to rest in the bottom of the screw cavity in the pin member and as having an outside nut 26 at its lower end engageable with the lower end of the pin to firmly and positively secure the liner in place. Suitable gaskets 27 may be located at the ends of the liner or bushing to insure tight joints with the pin structure.

To further exclude sand and grit at the lower end of the valve sleeve, a suitable gland may be provided such as indicated at 28, which can be set up against the sleeve by the gland nut 29 which screws on the lower end of the liner sleeve. This gland nut is shown as carrying the valve seat 30 providing a valve face at the lower end of the pin member of the joint for engagement by the valve shoulder on the lower end of the sleeve.

The form of the invention last described has the advantage that it can be made up as a unitary structure and then be applied to any ordinary tool joint. When its use is no longer required, it may be just as easily removed from the tool joint.

In Fig. 4 another form of liner construction for providing the valve faces in the bore and at the lower end of the pin member is illustrated, but in this case the lining sleeve 31 has a screw connection at 32 in the lower end of the bushing member. This illustration shows also how a packing may be provided about the upper end of the sleeve at 33, which can be set up from below by the gland nut 34 and slip sleeve 37, the gland nut in this case serving as the lower valve face.

The invention is adaptable to various types of tool joints and couplings, those of the "flush" joint as well as of the outside joints first disclosed. Thus as shown in Fig. 5, the invention may be applied to a flush tool joint or coupling such as indicated at 35. The upper end of the valve sleeve or wash pipe is shown as slotted at 36 to provide circulation about the spring and wash out the cavity in which the spring is seated. The spring is thus kept clean so that it will operate properly.

The sleeve form of valve disclosed permits practically an unobstructed straight through flow with but slight deviation of the flow, and it will be noted that the diverted flow, where it issues from the slots 9 strikes against the heavy or thickest body portion of the box member (Fig. 2) of the joint, where what cutting tendency there is can work the least injury. In the flush joint coupling form of the invention shown in Fig. 5, the flow issuing from the slots will strike against the upset or thickened end portion 38 of the drill pipe 39, so that in this case also any cutting effect can not work much injury as it is directed against the thickest and strongest parts of the drill string. The area of the ports can be made equal to or greater than the cross-sectional area of the bore in the pin member, so that the flow is not materially retarded. The closed end portion of the valve sleeve below the ports collects a cushion of fluid which cushions the velocity of the downward flow, reducing the cutting tendency and strain on the valve to that extent. The length and fairly large diameter of the valve sleeve provide ample sealing surface and insure smooth easy sliding action of the valve in its seat. In facing the bore in the pin member, in the first or unlined form of the invention, to form the valve seat, the bore may be enlarged an amount equal to the thickness of the valve sleeve or in the second form of the invention, an amount equal to the combined thickness of the valve sleeve and the liner, so as not to reduce the flow passage through the joint at all, the size of the joint members usually permitting this construction. The two separate seals of the valve, that is the cylindrical seal about the body of the valve and the seal at the lower end of the valve are each usually sufficient to hold the well pressure so that if one gives way, the other will still be fully effective for the purposes of the valve. The end valve seat may be cut away considerably without destroying its efficiency, but even if it should lose its efficiency, the side seal is effective to hold the pressure. The clearance of the sliding seal may be made fine enough to exclude sand, and any fine mud entering will have a tendency to seal off any possible leak. The pin carrying the valve can be run in different boxes or different lengths of pipe from time to time to prevent any parts from becoming badly worn by cutting action of the flow. The valve by its incorporation in the regular tool joint or coupling structure takes up no additional room in the drill pipe string. Any foreign matter going down the drill pipe, if it can be passed through the valve ports can pass down the well outside the valve, and if it will not pass the valve ports, it can settle in the dead end of the valve. Foreign matter forced back through the valve has a clear and larger diameter to pass up through the valve. If the valve closing spring 19 is used, the valve will stand closed against well pressure. On the other hand, if the spring is not used, the valve will remain open until back pressure in the well closes it. In the open position, with the valve ports below the end valve seat, sand in the drilling fluid will not cut the seat. In wells where a small loss of drilling mud causes a building up of pressure, the valve can be run with the spring, in the closed position. In wells where there is a large percentage of sand that quickly settles out of the drilling mud, the valve can be run without the spring, in the open position. In either case, the valve will quickly and positively close against back pressure within the well. The circulation goes through the spring as well as down through the valve, to keep the spring clear, but even should the spring become blocked or sanded up, the valve can still close even tho it may not be able to open or to open fully.

The locking seal at the end of the valve may be changed to meet varying conditions of mud, thus the sealing ring may be of hardened steel, brass, Babbitt lead, rubber or other material. The cushioning of the locking seal reduces the shock of closing and prevents injury to the sealing ring and other parts. The ports in the sliding seal have a shearing action tending to clear the valve of any foreign matter lodging in the valve ports.

The valve structure is a simple manufacturing proposition and can be made up to go with any regular rotary tool joint or coupling. Furthermore, when not desired, the valve can be readily removed and the tool joint or coupling restored to its ordinary single function purpose.

While there are advantages in having the valve incorporated in a tool joint or coupling the same may be made up in a special valve body designed for the purpose.

The sand or grit passing through the valve, changes direction, Figure 2, against a liquid cushion and not against metal, injurious wear of the metal parts by such flow being thereby avoided.

The valve may be used as a float valve to "float" in a string of pipe in a well. In such case the valve-closing spring would probably not be used, the valve closing automatically as it encounters the liquid in the well and allowing the pipe to be "floated" into position. When circulation is started the valve will open, but it will again close automatically if superior pressure is met with. When the pipe is withdrawn, the valve will open to drain the pipe, thus leaving the "mud" in the well to maintain the hydrostatic head on the formation.

What is claimed is:—

1. A rotary tool joint, in which the pin member of the joint has the bore and the lower end of the same faced to form valve seats and a cooperating valve member sliding in said valve seat faced bore and engaging the valve seat faced end of the pin member to provide a double seal.

2. A rotary tool joint, comprising box and pin members, the bore of the pin member and the lower end of the same being faced to form valve seats and a ported valve sleeve sliding in said valve seat faced bore and shouldered to cooperate with the valve seat faced end of the pin member.

3. A back pressure valve for drill strings, comprising a member insertable in a string of pipe, said member having a bore therethrough, a valve seat at one end of said bore, a ported valve sleeve operating in said bore and a yielding valve shoulder carried by the valve sleeve for cooperation with the valve seat on the end of the member.

4. A back pressure valve for drill strings, comprising a member insertable in a drill string and provided with a bore therethrough, said member having a valve seat at the end of said bore, a valve sleeve operating in the bore and a resiliently cushioned movable valve shoulder on the valve sleeve for engagement with the valve seat on the member.

5. As an article of manufacture, a check valve attachment for rotary tool joints, comprising a liner insertable into and provided with means for securing the same in the bore of the pin member of a rotary tool joint and a valve sleeve operable in said liner to positively control flow therethrough.

6. A back pressure valve structure for rotary drill strings, comprising a valve body insertible in a string of drill pipe and having a bore with a valve seat surrounding the lower end of the same, a ported, hollow valve sleeve sliding in said bore and having a valve head at the lower end of the same for sealing engagement with said valve seat and interchangeable sealing members of different character adapted to said head to suit the formation in which the device is used.

7. As a new article of manufacture, a cylindrical valve liner constructed for detachable mounting in the bore of the pin member of a rotary tool joint and a ported valve sleeve slidingly engaged in said liner, said sleeve being closed at the lower end having an external valve shoulder at said closed lower end for cooperative engagement with the lower end of the valve liner and said sleeve being open at the upper end and provided with an external shoulder for cooperative engagement with the upper end of the valve liner, whereby said valve may be mounted in a rotary tool joint by said liner and said liner will then act to control the reciprocating movement of said valve sleeve.

8. In combination with the joint member of a string of rotary drill pipe, said joint member being arranged in the pipe with clearance at the lower end of the same and said lower end of the member being faced to form a valve seat and stop, a ported sleeve valve operating in said member, said sleeve valve having a closed lower end externally shouldered to cooperate with the faced lower end of the joint member and said closed shouldered lower end of the sleeve valve operating in the clear space below the lower end of the member and said sleeve valve having a lowered position in which the ported portion of the same will be in communication with the clear space below the lower end of the joint member.

9. In combination with the joint member of a string of rotary drill pipe, said joint member being arranged in the pipe with clearance at the lower end of the same and said lower end of the member being faced to form a valve seat and stop, a ported sleeve valve operating in said member, said sleeve valve having a closed lower end externally shouldered to cooperate with the faced lower end of the joint member and said closed shouldered lower end of the sleeve valve operating in the clear space below the lower end of the member and said sleeve valve having a lowered position in which the ported portion of the same will be in communication with the clear space below the lower end of the joint member, the upper end of the sleeve valve being open and externally shouldered to provide a stop cooperative with the upper end portion of the joint member to limit the downward opening movement of the sleeve valve.

In testimony whereof I affix my signature.

JAMES C. FORTUNE.